No. 839,379. PATENTED DEC. 25, 1906.
S. J. GIBBONEY & J. W. RYAN.
MULTISCOPE.
APPLICATION FILED MAY 15, 1905.

Witnesses
Philip A. H. Ferrell
John E. Moore

Inventors
John W. Ryan and
Samuel J. Gibboney
by David B. Moore
Attorney

UNITED STATES PATENT OFFICE.

SAMUEL J. GIBBONEY AND JOHN W. RYAN, OF MOUNT PLEASANT, PENNSYLVANIA.

MULTISCOPE.

No. 839,379.  Specification of Letters Patent.  Patented Dec. 25, 1906.

Application filed May 15, 1905. Serial No. 260,545.

*To all whom it may concern:*

Be it known that we, SAMUEL J. GIBBONEY and JOHN W. RYAN, citizens of the United States, residing at Mount Pleasant, in the county of Westmoreland and State of Pennsylvania, have invented certain new and useful Improvements in Multiscopes, of which the following is a specification, reference being had therein to the accompanying drawings.

Our present invention relates to improvements in multiscopes; and the main object of our invention is the provision of a multiscope by which amazing, amusing, and interesting experiments may be obtained. To this end we provide a peculiar construction of case or casing open at both ends and slightly tapered, and in the enlarged end we mount a crystal or lens containing a series or multiplicity of facets, the smaller end being opened and meant for a peep or observation hole. By so constructing this device the object at which the lens is pointed is multiplied and in the special form we employ is increased twenty-four times.

To attain these objects our invention consists of a multiscope embodying novel features of construction and combination of parts substantially as disclosed herein.

Figure 1:
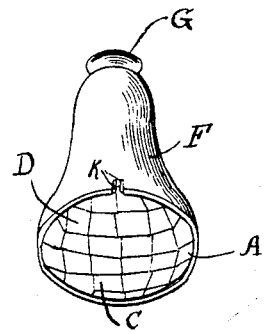
Figure 2:
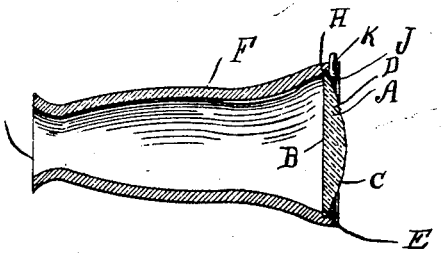
Figure 3:
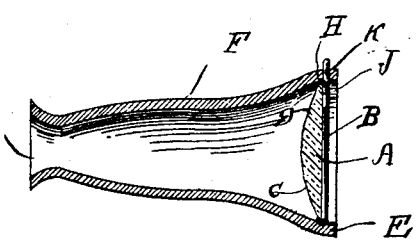
Figure 4:
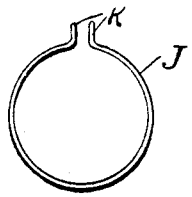

In the accompanying drawings, Figure 1 is a perspective view of the complete device. Fig. 2 is a sectional view through the lens and the case. Fig. 3 is a sectional view showing the lens inverted. Fig. 4 is a detail view.

Referring to the drawings, A designates a lens or crystal which is provided with a flat surface B and a series of flat surfaces C and D, these surfaces being on different planes or angles, so as to make the contour of the entire crystal appear convex. By this means we provide a series of facets, each of which acts individually as a lens.

The lens is adapted to be mounted in the enlarged open end E of the substantially coned-shaped casing F, which is hollow and is provided with the reduced open end or observation or peep hole G. In the enlarged end we provide an annular shoulder H, against which the crystal rests, and in order to hold the same in place we provide a bead or fastening means J to securely hold the lens in position.

In the form shown in Figs. 1 and 2 the convex surface of the lens extends outward; but in the form shown in Fig. 3 the lens is inverted. By this means with the same lens different results may be attained, and in order that the lens may be removed we provide the detachable means K, (shown in Fig. 3,) by which means the lens may be removed and inverted at pleasure.

In order to obtain the best results, the entire case or observing-tube is lined with an opaque material, so as to prevent any refraction or reflection within the same, thus preventing any obstruction to the vision when observing an object through the peep-hole.

From the foregoing description it is evident that we provide a means whereby interesting experiments may be made and also amazing and amusing observations obtained. When looking through the peep-hole of either construction as shown in Figs. 1 or 3, each surface upon the convex surface of the lens will show its particular object, so that the single object at which the device is projected will be multiplied according to the number of facets and by slightly turning the casing or tube the object appears to rotate, so that amusing experiments may be obtained.

What we claim as new, and desire to secure by Letters Patent, is—

The herein-described device, consisting of a hollow substantially truncated-cone-shaped casing having a small observation-opening and an enlarged lens-receiving opening, said lens-receiving opening having a recess or bead, and a lens having a flat surface and a slightly-convex surface, the convex surface being provided with a plurality of facets, each acting as an individual lens, and means for removably holding the lens within the bead of the enlarged opening of the case; whereby the lens may be removed and reversed at pleasure.

In testimony whereof we affix our signatures in presence of two witnesses.

SAMUEL J. GIBBONEY.
JOHN W. RYAN.

Witnesses:
D. K. HERSHBERGER,
I. J. McWILLIAMS.